Dec. 5, 1961   W. R. GRADY ET AL   3,012,088
STORAGE BATTERY HEATING ATTACHMENT
Filed Feb. 19, 1960
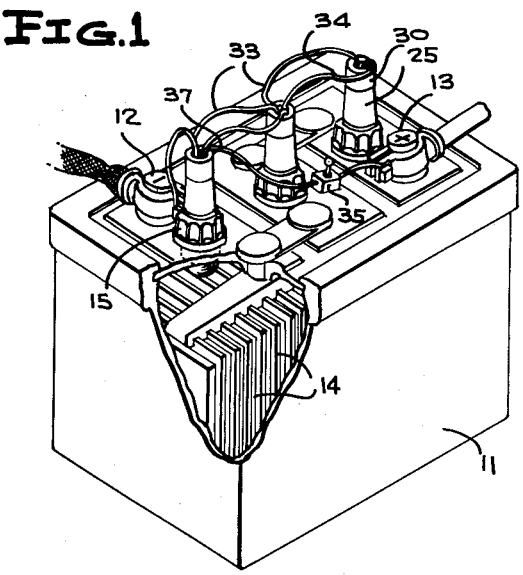
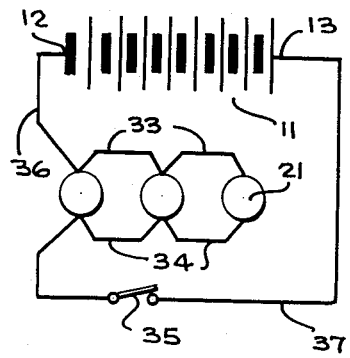
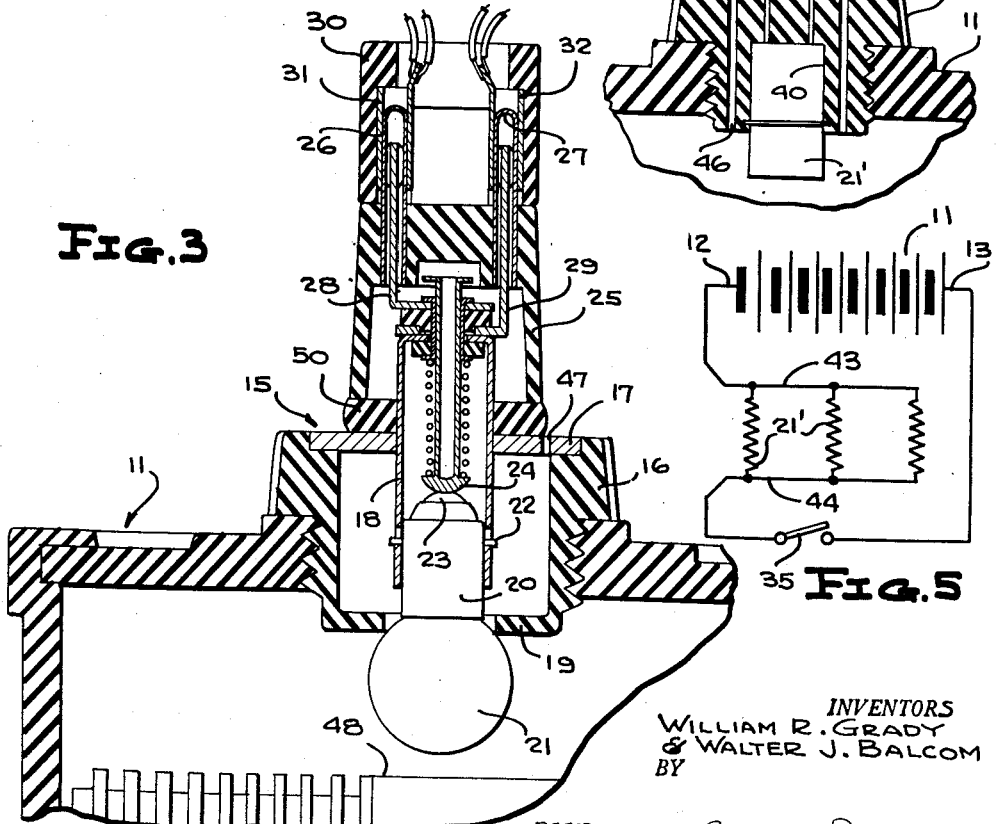
INVENTORS
WILLIAM R. GRADY
& WALTER J. BALCOM
BY
McMorrow, Berman-Davidson
ATTORNEYS 3,012,088
STORAGE BATTERY HEATING ATTACHMENT
William R. Grady, 4321 W. Haddon Ave., Chicago, Ill., and Walter J. Balcom, 7N151 Eagle Terrace Drive, Medinah, Ill.
Filed Feb. 19, 1960, Ser. No. 9,916
1 Claim. (Cl. 136—161)

This invention relates to batteries, and more particularly to a heating attachment for a storage battery, whereby the storage battery may be maintained substantially at a proper temperature for the efficient operation thereof.

A main object of the invention is to provide a novel and improved heating attachment for a storage battery, the attachment being simple in construction, being easy to install, and being very compact in size.

A further object of the invention is to provide an improved heating attachment for a storage battery which is arranged to employ the stored electrical energy of the battery as a means for heating same, so as to maintain the battery at a proper temperature for efficient operation thereof, the attachment involving inexpensive components, being durable in construction, and being arranged so that it may be installed in place of the normal vent plugs employed on the respective cells of the battery.

Further objects and advantages of the invention will become apparent from the following description and claim, and from the accompanying drawings, wherein:

FIGURE 1 is a perspective view of a storage battery, with a portion thereof broken away, provided with an improved heating attachment in accordance with the present invention.

FIGURE 2 is an electrical circuit diagram showing the connections of the elements of the heating attachment of FIGURE 1 to the respective terminals of the storage battery.

FIGURE 3 is an enlarged vertical cross sectional view taken through the top portion of one of the cells of the battery and showing the structural details of the heating member associated therewith.

FIGURE 4 is a fragmentary cross sectional view taken through the vent plug of a storage battery and showing the manner in which a heating resistor may be installed in the plug for providing a heating effect, in accordance with the concept of the present invention.

FIGURE 5 is an electrical wiring diagram, similar to FIGURE 2, and showing the manner in which the heating resistors of FIGURE 4 are connected in parallel and are thereafter connected through a suitable control switch to the respective terminals of the storage battery.

Referring to the drawings, and more particularly to FIGURES 1, 2 and 3, 11 designates a conventional storage battery which is ordinarily provided with the usual vent plugs in the top walls of its respective cells and which includes a pair of terminals 12 and 13. Each of the cells of the battery contains the usual plates 14 and a quantity of electrolyte. As is well known, it is desirable to maintain the contents of the battery cells at a relatively moderately elevated temperature for maximum efficiency of operation of the cells. When a storage battery is employed in a motor vehicle, the battery is exposed to weather conditions and therefore the temperature of the battery may drop to a relatively low value in cold weather, thereby severely impairing the efficiency of operation of the battery.

In accordance with the present invention, heating means are provided to maintain the cells of the battery at a suitable temperature, said means being energized from the battery itself. Thus, the embodiment of the invention illustrated in FIGURES 1, 2 and 3 shows respective heating assemblies 15 which are engaged in the top vent openings of the respective cells in place of the normal vent plugs.

As shown in FIGURE 3, each of the heating assemblies 15 comprises a plug member 16 which is threaded so as to be substantially identical with the normal vent plug and which is provided with a circular top wall member 17 in which is axially secured a lamp socket 18. The cap member 16 is provided with a centrally apertured bottom wall 19 through which is inserted the shell portion 20 of a lamp bulb 21, the shell portion 20 being provided with the usual bayonet pins 22 which are lockingly engageable in the socket 18 and which hold the lamp 21 in a position such that its center contact 23 is in engagement with the center contact terminal 24 of the lamp socket. Secured on the top portion of the socket 18 and on the top surface of the circular wall member 17 is a two-prong male connecter 25 which receives the top end of the socket 18 and which is provided with the respective prongs 26 and 27 to which are connected the respective terminals 28 and 29 of the lamp socket 18.

Detachably engaged on the prongs 26 and 27 of the respective male connector members 25 are the respective female sockets 30, each of which is provided with the terminal sleeves 31 and 32 which receive the respective prongs 26 and 27 of the associated male connector 25 to establish electrical contact therewith.

The female connectors 30 are connected in parallel, by the respective flexible conductors 33 and 34, as shown in FIGURE 2, and the parallel connected female connectors are connected to the respective terminals 12 and 13 of the battery 11 through a manually operated switch 35 in the manner illustrated in FIGURE 2. Thus, the conductors 33 are connected to the terminal 12 of the battery by a flexible insulated conductor 36, and the conductors 34 are connected through the switch 35 and a flexible insulated conductor 37 to the battery terminal 13.

The bulbs 21 are of conventional construction and have a sufficient wattage rating so that when energized they will develop enough heat to maintain the temperature inside the cells of the storage battery 11 at the required value. However, the current drain of the lamp bulbs 21 is relatively low, so that excessive current is not drawn from the battery during the periods when it is not being charged. Thus, the temperature of the electrolyte and the plates 14 in the cells may be raised by closing the switch 35 and allowing the bulbs 21 to remain energized for a period of time. In cold weather, the heating effect of the bulbs 21 is sufficient to keep the battery warm enough for efficient operation. Thus, the lamp bulbs 21 may have a rating such that they draw approximately one-eighth of an ampere, in which case the total drain on the battery is three-eighths of an ampere, which is negligible in the case of an automobile battery, which is recharged when the automobile is in operation and which ordinarily has a capacity of one hundred ampere hours or more.

FIGURES 4 and 5 illustrate a modification of the present invention wherein heating resistors 21' are employed in place of the lamp bulbs of the previously described embodiment of the invention. Thus, cap members 16' are substituted for the normal vent plugs of the battery, the cap members being formed with axial cylindrical cavities 40 in which are secured the heating resistors 21', the resistors 21' depending substantial distances below the bottom surfaces of the cap members, as is clearly illustrated in FIGURE 4. The heating resistors 21' are provided with the terminal wires 41 and 42, and the terminal wires 41 and 42 are connected in parallel by the respective flexible conductors 43 and 44, as shown in FIGURE 5. The conductor 43 is connected to the terminal 12 of the battery 11, and the conductor 44 is connected through a manual control switch 35 to the terminal 13 of the battery, in the same manner as in the previously described form of the invention.

As shown in FIGURE 4, the cap members are preferably provided with vertical vent openings 46, corresponding to the vent openings provided on the normal vent caps.

In the embodiment illustrated in FIGURES 1, 2 and 3, the top wall members 17 of the cap member 16 are provided with vent apertures 47 corresponding to the vent apertures provided in the normal vent plugs of the battery.

It will be noted in FIGURE 3 that the lamp bulbs 21 are supported a sufficient distance above the normal level of the electrolyte 48 so that there will be little or no direct contact of the bulbs with the electrolyte. However, due to the proximity of the bulbs to the liquid, a substantial amount of heat is transmitted from the bulbs to the electrolyte when the bulbs are energized. In the arrangement illustrated in FIGURE 4, the heating resistors 21' are located in the same manner as the bulbs 21 in FIGURE 3 and perform the same function. The resistors 21' are preferably of the same order of resistance as the lamp bulbs 21 and thus impose relatively low drain on the battery 11.

With respect to the form of the invention illustrated in FIGURES 1, 2 and 3, an important feature thereof is the fact that the illumination provided by the lamp bulbs 21 gives an indication that the device is operating. For this reason, the top wall member 17 or other parts of the plug member 16 may be made of material having sufficient light transmission to provide a glow when the associated lamp bulb 21 is energized.

If so desired, special types of gas-filled bulbs having relatively high heat dissipation may be employed.

It will be further noted that the unit is self-contained and requires no external source of power, so that the unit is always available for use with the battery. The unit of either FIGURES 1, 2 and 3 or FIGURES 4 and 5, may be adapted for use with any standard six volt or twelve volt battery without requiring any modification of the physical structure of the battery itself.

Since the female plug elements 30 in FIGURES 1, 2 and 3, are readily detachable, the plug member 16 may be easily removed from the battery cells whenever required.

Soft rubber washers 50 are employed between the rigid main body portions of the male connector members 25 and the top wall elements 17 of the plug members 16 for the purpose of maintaining a tight joint between the male connector members 25 and the plug members 16. This is accomplished by compressing the rubber washers 50 during the assembly of each unit, the compression being maintained on the rubber washers 50 by the connections of the conductors 28 and 29 with the inside surfaces of the male prongs 26 and 27.

While certain specific embodiments of an improved heating attachment for a storage battery have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a storage battery of the type having a plurality of cells, a pair of terminals, and internally threaded vent plug openings in the top walls of the cells, respective plug members threadedly engaged in the vent plug openings, respective lamp sockets mounted substantially axially in the plug members and facing downwardly, respective lamps engaged in said sockets and depending from said plug members in positions to transmit radiant heat directly to the electrolyte in the cells when energized, upstanding terminal prongs mounted on and projecting upwardly from the respective plug members and connected to said lamp sockets, female connectors detachably engaged on said terminal prongs, conductor means connecting said female connectors in parallel, and additional conductor means including a control switch connecting the parallel-connected female connectors to the respective terminals of the battery.

References Cited in the file of this patent

UNITED STATES PATENTS

| | | |
|---|---|---|
| 2,516,048 | Endress | July 18, 1950 |
| 2,611,853 | Kerby | Sept. 23, 1952 |
| 2,626,971 | Mansoff | Jan. 27, 1953 |
| 2,674,643 | Dahl et al. | Apr. 6, 1954 |
| 2,700,064 | Akerman | Jan. 18, 1955 |